United States Patent [19]
Gloess

[11] Patent Number: 5,511,071
[45] Date of Patent: Apr. 23, 1996

[54] CIRCUIT ARRANGEMENT FOR SETTING UP CONFERENCE CALLS IN A DIGITAL TIME-DIVISION MULTIPLEX TELECOMMUNICATIONS SWITCHING CENTER

[75] Inventor: Bernhard Gloess, Munich, Germany

[73] Assignee: Siemens Aktiengesellschaft, Munich, Germany

[21] Appl. No.: 198,606

[22] Filed: Feb. 18, 1994

[30] Foreign Application Priority Data

Feb. 23, 1993 [EP] European Pat. Off. ............ 93102780

[51] Int. Cl.⁶ .................................................. H04L 12/18
[52] U.S. Cl. ............................ 370/62; 370/110.4; 379/202
[58] Field of Search .......................... 370/58.1, 58.2, 370/110.4, 62; 379/158, 202

[56] References Cited

U.S. PATENT DOCUMENTS

| | | | |
|---|---|---|---|
| 4,190,744 | 2/1980 | Frank | 370/62 X |
| 4,301,531 | 11/1981 | Lubin | 370/62 |
| 4,393,496 | 7/1983 | Zeiträeg | 370/62 |
| 4,757,494 | 7/1988 | Renner | 370/62 |

FOREIGN PATENT DOCUMENTS

| | | | |
|---|---|---|---|
| 0177465 | 4/1986 | European Pat. Off. | H04M 3/56 |
| 0358028 | 3/1990 | European Pat. Off. | H04M 3/56 |
| 3226430 | 1/1984 | Germany | H04Q 11/04 |

*Primary Examiner*—Douglas W. Olms
*Assistant Examiner*—Russell W. Blum
*Attorney, Agent, or Firm*—Hill, Steadman & Simpson

[57] ABSTRACT

A circuit arrangement sets up conference calls in a digital time-division multiplex telecommunications switching center. For setting up three-party connections, a conference unit (KE) having a PROM is provided wherein are stored all possible, companded sum and difference values of individual contributions of respectively two conference participants. These are selected by the individual contributions as read selection addresses. The PROM thus realizes the functions of linearization of the sum and difference and of companding that are performed by separate sub-units in previous conference units.

8 Claims, 4 Drawing Sheets

CIRCUIT ARRANGEMENT FOR SETTING UP CONFERENCE CALLS IN A DIGITAL TIME-DIVISION MULTIPLEX TELECOMMUNICATIONS SWITCHING CENTER

BACKGROUND OF THE INVENTION

The present invention is directed to a circuit arrangement for setting up conference connections in a digital time-division multiplex telecommunications switching center.

Such a circuit arrangement has a conference unit that lies in a return loop that connects the output of the voice memory that can be cyclically written into and randomly read out and that is preferably a component part of a switching network of the switching center that represents a line/trunk group for the connection of subscriber and trunk lines to the output thereof.

In such a circuit arrangement, time slots that directly follow one another and that are utilized in conjunction with the handling of conference calls (conference time slots) are additionally established on the multiplex lines connected to the input side and output side of the voice memory beyond the plurality of time slots wherein information transmissions occur from and to the switching center (transmission time slots). Corresponding to the additional time slots, conference memory cells are provided in the voice memory of the switching network and in the appertaining holding memory in addition to the voice memory cells or, respectively, holding memory cells required in the course of a switching of two-party connections. During the course of a conference call, the individual signals of the conference participants converted into conference time slots in such a circuit arrangement by random read-out from the voice memory are processed by the conference unit into final aggregate signals intended for the individual conference participants after passing through a means for linearization. These final aggregate signals do not contain the intrinsic or home part of the appertaining subscriber. After these final aggregate signals have passed through a means for companding, they return in these conference time slots to the voice memory. They are then forwarded by random read-out from the voice memory into transmission slots on the multiplex line of the output side respectively allocated to the conference participants.

SUMMARY OF THE INVENTION

It is an object of the present invention to provide a conference unit and a part of such a circuit arrangement which provides the immediate support area thereof.

In general terms the present invention is a circuit arrangement for setting up conference connections in a digital time-division multiplex telecommunications switching center that lies in a feedback loop connecting to the output of a voice memory of the switching network that can be cyclically written into and randomly read-out, preferably a group switching network of the switching center, to the input thereof. Multiplex lines are connected to the input side and output side of the voice memory on which directly successive time slots (conference time slots) are additionally formed beyond the plurality of time slots wherein information transmissions ensue from and to the switching center (transmission time slots). Conference memory cells are allocated to these conference time slots provided in the voice memory and in its appertaining holding memory in addition to the voice memory cells or holding memory cells required during the course of a switching of two-party connections.

During the course of a conference connection, the conference unit receives individual signals of the conference participants converted into conference time slots by random read-out from the voice memory and, after a linearization thereof, forms result signals therefrom individually associated to conference participants that do not contain the intrinsic or home part. The conference unit outputs these result signals onto the multiplex line of the input side in corresponding conference time slots after a companding. They then proceed given cyclical write-in into the allocated additional memory cells and these result signals, after random read-out, are further, transmitted on the multiplex line of the output side in transmission time slots allocated to the conference participants. For setting up conference calls having three participating conference participants, the conference unit contains a read-only memory, by means of which both the functions of linearization and of companding as well as the functions of adding are performed. As a result the result signals are supplied with the various groups of two of individual signals of respectively two conference participants supplied in the successive conference time slots as selection addresses for the read selection of the memory location containing the respective result signal in companded form.

In a further development of the present invention the read-only memory has a first memory area in whose memory locations all possible, companded sum values of two individual signals are stored. The read-only memory also has a second memory area in whose memory locations all possible companded difference values between two individual signals are stored. A comparator is provided to which the operational sign bits of the respective groups of two individual signals are supplied and whose output signal determines which of the two memory areas the selection addresses formed by the remaining bits of two individual signals act as read addresses. A decision circuit is provided to which is supplied an area signal output together with the result signal output from the read-only memory. This indicates whether the result signal derives from the first memory area or from a part of the second memory area wherein result signals are stored corresponding to a difference between a larger and a smaller individual signal or whether the result signal derives from a part of the second memory area wherein result signals corresponding to a difference between a smaller and a larger individual signal are stored. The operational sign bit of the second individual signal is supplied to the decision circuit, which outputs this operational sign bit in original form as an operational sign bit of the result signal to be forwarded in case of a first-sided area signal value and outputs this operational sign bit in inverted form as an operational sign bit of the result signal to be forwarded in case of a second-sided area signal value.

Given the mixing-in of a call progress tone, the appertaining results signals are supplied a second time to the conference unit together with a signal corresponding to the call progress tone and are handled like the individual signal of a further conference subscriber supplied to the read-only memory.

The conference unit of the circuit arrangement of the present invention consequently contains a read-only memory by means of which both the functions of linearization and companding as well as the function of adding are implemented. To this end, the individual signals of respectively two conference participants supplied to various two-party groups in the successive conference time slots are supplied to this read-only memory as drive addresses for the read drive of the memory location respectively containing the result signal in companded form.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
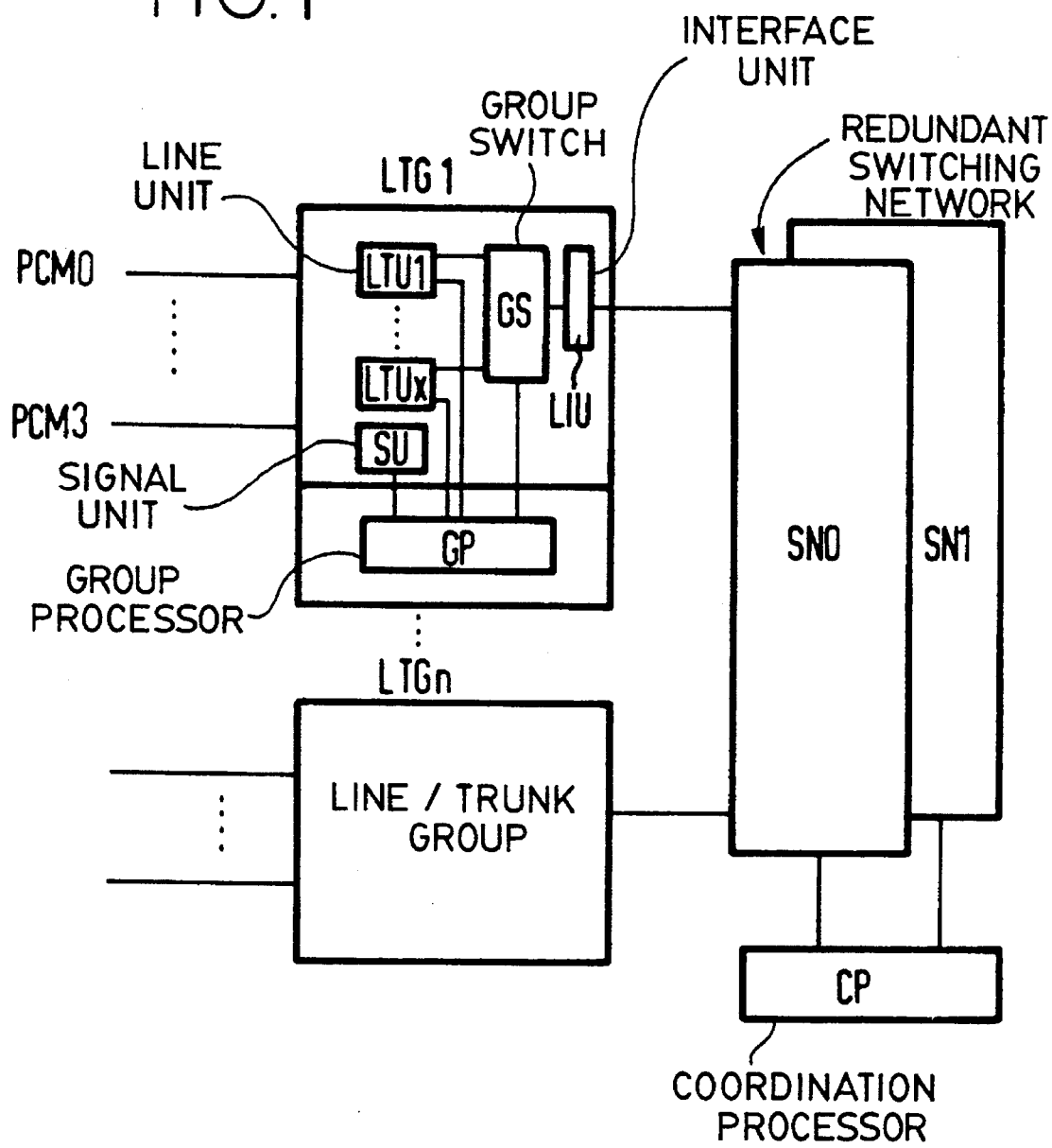
FIG. 1 is a block diagram of one possible structure of a digital time-division multiplex telephone switching center.

The digital time-division multiplex telephone switching center shown in FIG. 1 is composed of a number of line/trunk groups LTG1 through LTGn, of a redundant switching network SN0/SN1, as well as of a coordination processor CP.

The line/trunk groups LTG1 through LTGn form the interface between the analog or digital environment of the switching center and the switching network. Potentially upon interposition of a concentrating, digital line unit (not shown), subscriber lines connecting to subscribers and/or trunk lines PCM0 through PCM3 connecting to other switching centers are accordingly connected to it.

As critical component parts, the line/trunk groups, as shown in detail in the case of line/trunk group LTG1, contain line units LTU1 through LTUx which in turn contain the subscriber circuits or line circuits (not shown here), further contain the group switch GS, an interface unit LIU, which represents the interface between the line/trunk group and the switching network, a signal unit SU, as well as a group processor GP. The group processor controls these units and processes selection information received via the subscriber or trunk lines and is in communication with the coordination processor CP in an exchange of control characters in conjunction with the setup and cleardown of connections. Moreover, the group processor GP implements routine checks and assumes watchdog jobs.

Figure 2:
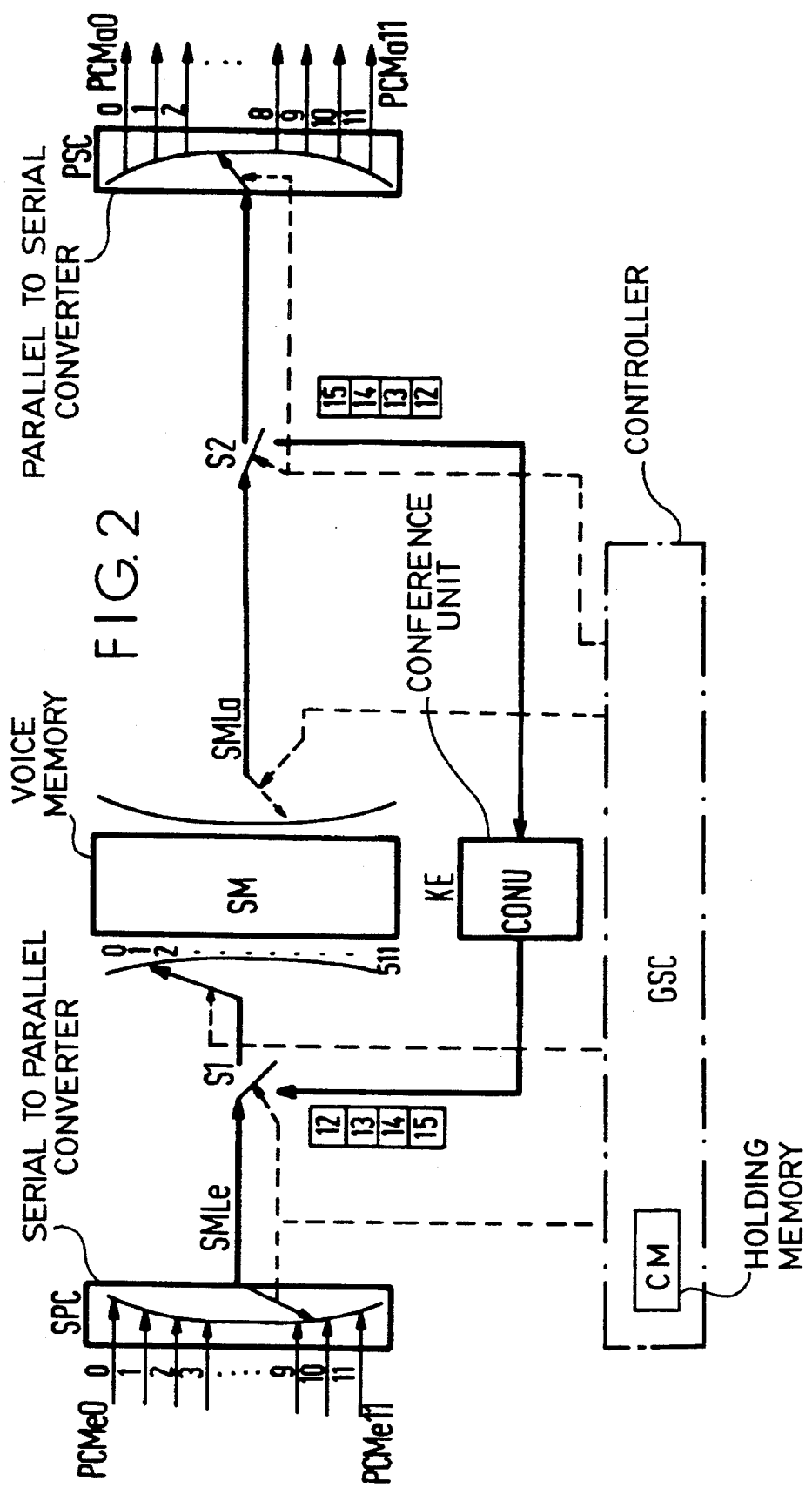
FIG. 2 is a block diagram of a line/trunk group having a conference unit in such a switching center.

FIG. 2 shows in more detail a part of the line/trunk group LTG of FIG. 1 together with a conference unit.

The connection of twelve PCM lines is assumed, respectively 32 time channels being formed thereon. The branches for incoming transmission direction PCMe0 through PCMe11 of the PCM lines are connected to a serial-to-parallel converter SPC. The converter SPC also acts as a multiplexer with which the individual bits of the PCM words incoming on the PCM lines are distributed (after a serial-to-parallel conversion) onto the eight leads of the reception branch SMLe of a multi-lead super multiplex line (assuming respectively eight bits per PCM word). They are chronologically nested by multiplex formation on this super multiplex line such that the PCM words transmitted in the time channel zero on the PCM lines PCMe0 through PMCe11 first successively appear, then those transmitted in time channel one successively appear, etc., and, finally, the PCM words transmitted in time channel 32 successively appear.

The executive sequencing of the multiplexer, however, works with such a high read-out clock that additional time slots, referred to below as conference time slots, are formed over and above the time slots for the PCM words of the four PCM lines, these being referred to here as transmission time slots. In accord with an assumed maximum number of three conference participants per conference and sixty four simultaneously possible conferences, there are sixty four groups of respectively three successively appearing time slots. Insofar as the mixing-in of call progress tones into the conference calls is provided, these being handled like the conference parts of a further conference participant, further conference time slots are added.

The reception branch SMLe of the super multiplex line leads to a voice memory SM that forms the group switch GS of FIG. 1 together with the corresponding activation. Corresponding to the 384 transmission time slots formed on the super multiplex line, the memory SM has 384 memory cells, each for respectively one PCM word. In addition (corresponding to the, additional conference time slots), it has a corresponding plurality of further memory cells, each for respectively one PCM word, that form the groups of memory cells corresponding to the grouping of the conference time slots.

The write-in into the voice memory SM from the incoming branch SMLe of the super multiplex line ensues cyclically. The read-out onto the outgoing branch SMLa of the super multiplex line, by contrast, occurs randomly. Time slot conditions that correspond to those on the incoming branch SMLe prevail on this outgoing branch SMLa.

FIG. 2 further shows a conference unit KE that lies in a return or feedback loop via which the output of the voice memory is connected to the input thereof given an appropriate switch position of the switch-over means S1, S2.

The illustrated arrangement is under the control of a controller GSC whose central part is a holding memory CM that supplies the selection addresses for the random read-out of the voice memory SM. This holding memory consequently contains a plurality of memory cells that is identical to the plurality of memory cells of the voice memory SM. The controller GSC also has the job of supplying selection addresses for the cyclical write-in of the voice memory SM as well as control signals for the actuation of the switch-over means S1 and S2.

The basic events in the handling of a conference call shall be discussed in brief below. It is thereby assumed that a conference is to exist between three conference participants A, B and C which supply individual signals in the form of corresponding PCM words to the voice memory SM on the incoming branches PCMe of the time-division multiplex lines or, respectively, on the corresponding transmission time slots on the super multiplex line SMLe for incoming transmission direction. These PCM words are deposited by cyclical write-in (as set forth above) into memory cells allocated to the transmission time slots. Given random read-out of the appertaining memory cells (by contrast to the conditions given a normal two-party connection) a conversion ensues onto immediately successive conference time slots formed on the super multiplex line SMLa and belonging to a group of conference time slots allocated to the appertaining conference. Via the switch S2, which assumes the illustrated switch position during these time spans, these individual signals proceed to the conference unit KE. Thereat, sums individually associated to conference participants are respectively formed from two signals. These sums do not contain the individual signal of that subscriber for whom they are intended. These sum signals proceed via the switch S1 back to the input of the voice memory SM in corresponding successive conference time slots. They are deposited during the course of the cyclical write-in thereat into memory cells allocated to the conference time slot. By random selection of these memory cells, a conversion then ensues onto transmission time slots formed on the super multiplex line SMAa for outgoing transmission direction that are allocated to the conference subscribers. From there, they proceed via the switch S2 (which has now been switched-over) to the parallel-to-serial converter PSC. They proceed from the converter PSC via a means for signal attenuation to the appertaining, outgoing branches PCMa0 through PCMa11 of the time-division multiplex lines.

Figure 3:
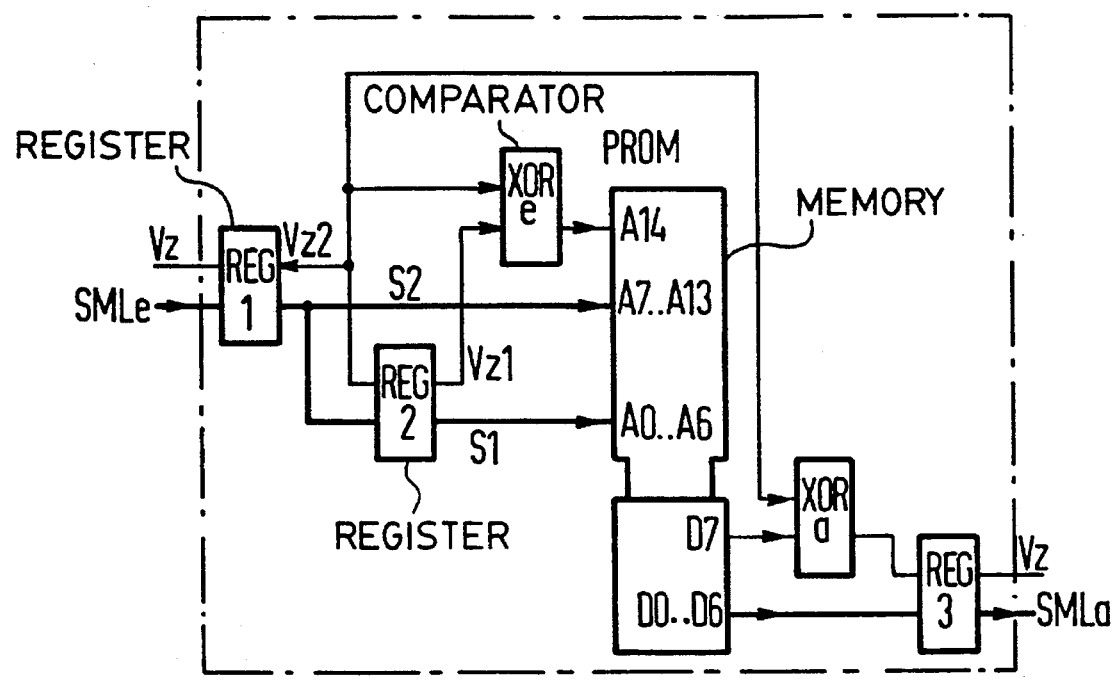
FIG. 3 is a block diagram of an exemplary embodiment of the conference unit of the present invention together with its circuit-oriented support area.

The inventive conference unit KE according to FIG. 3 has a programmable read-only memory PROM as its central part. The individual signals coming from the voice memory SM according to FIG. 2 via the super multiplex line SMLe, these individual signals appearing in groups of two of successive conference time slots, first proceed to a first register REG1. The operational sign bits BZ of the individual signals of such pairs proceed therefrom to the inputs of a comparator via a second register RG2 in the case of the one individual signal (operational sign bit Vz1) and proceed directly to the inputs of the comparator in the case of the second individual signal (operational sign bit Vz2), the comparator here being fashioned in the form of an exclusive-OR element XOR.

The remaining bits of the individual signals, which indicate the amplitude values of the corresponding voice signals, proceed to control inputs of the control part of the read-only memory PROM, likewise via the register REG2 in the case of the first individual signal S1 and directly in the case of the second individual signal S2, proceeding thereto as selection addresses A0 . . . A6 or, respectively, A7 . . . A13. As a further control signal, the result signal of the comparator XOR is supplied to the read-only memory PROM as selection signal A14.

Given the assumption of individual signals S1 and S2 in the form of PCM words, which has seven bits for the presentation of 128 amplitude levels as well as one operational sign bit, the read-only memory contains $128^2 = 16,384$ memory locations for all sum values in companded form, these deriving from the addition of the addends S1 and S2. It further has the same plurality of further memory locations for all difference values in companded form, these being capable of being formed from the individual values of the addends S1 and S2. The difference values S2–S1 reside in a first path of these further memory locations and the difference values S1–S2 reside in a second half thereof.

When the operational sign comparison Vz1/Vz2 with the comparator XORe yields equality, the values of the appertaining addends S1 and S2 lead to the selection of a corresponding memory cell in the first-cited part of the read-only memory PROM that contains sum values. The output of an area signal bit at the output D7 of the read-only memory ensues simultaneously with the output of this sum value in the form of a bit combination at the outputs D0 through D6 that encompasses seven bits. This area signal bit is supplied to an exclusive-OR element XORa together with the operational sign Vz2 of the addend S2. In the present case of read-out from the first half of the read-only memory containing sum values, the operational sign selection bit has such a binary value that the exclusive OR element always has one bit having the same binary value as that of the operational sign bit Vz2. Together with the bits output via the outputs D0 through D6, this represents a companded cumulative word that, after intermediate storage in a register REG3 of the output side in the manner set forth in conjunction with FIG. 2, is resupplied to the voice memory SM and, proceeding from the latter, is supplied to the third conference participant participating in the conference via a transmission time slot.

When the operational sign comparison with the exclusive-OR element XORe yields an inequality of the operational signs Vz1 and Vz2 of the addends S1 and S2, then the read-out ensues from the aforementioned, second half of the read-only memory PROM wherein the companded difference values of the addends S1 and S2 are stored.

Insofar as a memory location is thereby selected that contains the companded difference between a larger addend S2 and a smaller addend S1, the area signal bit output at the output D7 simultaneously with the partial word output at the outputs D0 through D6 assumes such a binary value (as set forth above) that the exclusive-OR element XORa forwards the operational sign bit Vz2 supplied to it in original form as an operational sign bit in the cumulative word.

When, however, a memory location in which the difference between a larger addend S1 and a smaller addend S2 is stored in companded form is selected, then the operational signal bit at the output D7 assumes the opposite value, with the consequence of an inversion of the operational sign bit Vz2.

Figure 4:
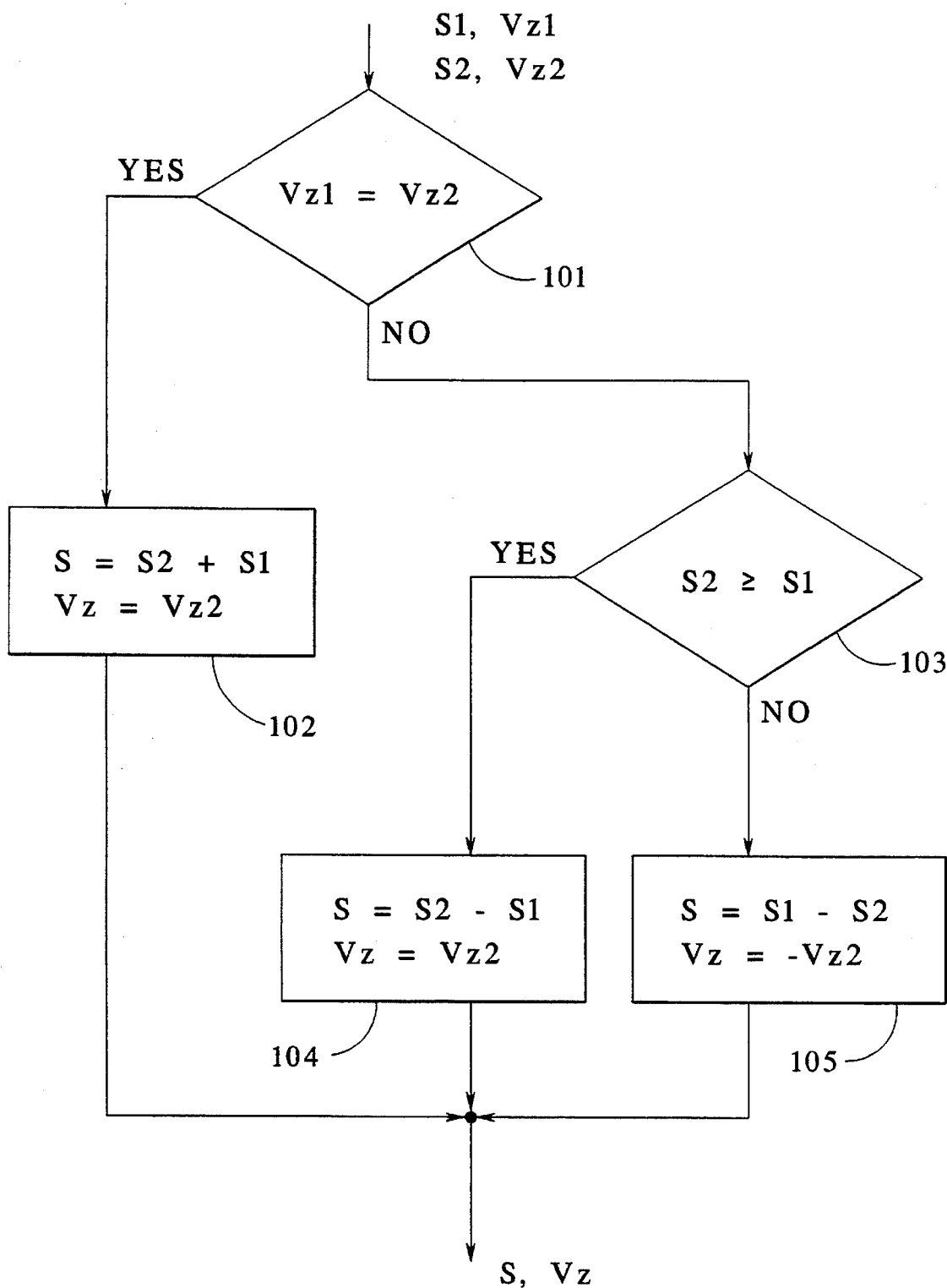
FIG. 4 depicts a structure program of the operational sequence of this conference unit.

The events set forth above are shown again in FIG. 4 in the form of a structural diagram. In accord therewith, the decision is first made as to whether the operational signs Vz1 and Vz2 of the two addends are the same or not (see element 101). In the case of equality, the sum S2+S1 is formed and is attached as operational sign bit Vz2 of the addend S2 (see element 102). Given inequality, the determination is made as to whether S2 is greater than or equal to S1 (see element 103). When this applies, then the difference S2–S1 is formed and Vz2 is likewise attached as operational sign bit (see element 104). When, by contrast, S2 is smaller than S1, then the difference S1–S2 is formed and the negated operational sign bit Vz2 is attached as operational sign bit (see element 105).

As recited, the circuit arrangement of the present invention is provided for the setup of conference calls wherein three conference participants participate. When a mixing of call progress tones into such conference calls is provided, the individual result signals would have to pass through the conference means a second time before being forwarded to the conference participants in order to effect the adding-up of the call progress tone like the individual signal of a further conference participant.

The circuit arrangement of the present invention can also be utilized for effecting tone offerings in normal two-party connections.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for setting up conference connections in a digital time-division multiplex telecommunications switching center, the circuit arrangement lying in a feedback loop connecting to an output of a voice memory of a switching network that is cyclically written into and randomly read-out to an input of the voice memory, multiplex lines being connected to the input and output of the voice memory on which directly successive conference time slots are additionally formed beyond a plurality of transmission time slots wherein information transmissions ensue from and to the switching center, said voice memory having in an appertaining hold memory conference memory cells, that are allocated to said conference time slots, in addition to holding memory cells that are required during the course of a switching of two-party connections, said circuit arrangement, during a conference connection, receiving individual signals of the conference participants converted into conference time slots by random read-out from the voice memory and, after a linearization thereof, forming result signals therefrom individually associated to conference participants that do not contain an intrinsic part and outputting these result signals onto the multiplex line connected to the input of the voice memory in corresponding conference time slots after a companding, the result signals being then cyclically written into the allocated additional conference memory cells and these result signals, after random read-out, being further, transmitted on the multiplex line connected to the output of the voice memory in transmission time slots allocated to the conference participants, comprising:

for setting up conference calls having three participating conference participants, a read-only memory, the read-only memory having separate memory areas for respectively storing sums of individual signals, and storing two types of differences of individual signals as a function of operational sign bits associated with the individual signals; utilizing the read-only memory, means for performing the functions of linearization and of companding, and a function of adding of said individual signals of the conference participants; and means for supplying thereto the various groups of two of individual signals of respectively two conference participants supplied in the successive conference time slots as selection addresses for a read selection of a memory location containing the respective result signal in companded form.

2. A circuit arrangement for setting up conference connections in a digital time-division multiplex telecommunications switching center, the circuit arrangement lying in a feedback loop connecting to an output of a voice memory of a switching network that is cyclically written into and randomly read-out to an input of the voice memory, multiplex lines being connected to the input and output of the voice memory on which directly successive conference time slots are additionally formed beyond a plurality of transmission time slots wherein information transmissions ensue from and to the switching center, said voice memory having in an appertaining hold memory conference memory cells, that are allocated to said conference time slots, in addition to holding memory cells that are required during the course of a switching of two-party connections, said circuit arrangement, during a conference connection, receiving individual signals of the conference participants converted into conference time slots by random read-out from the voice memory and, after a linearization thereof, forming result signals therefrom individually associated to conference participants that do not contain an intrinsic part and outputting these result signals onto the multiplex line connected to the input of the voice memory in corresponding conference time slots after a companding, the result signals being then cyclically written into the allocated additional conference memory cells and these result signals, after random read-out, being further, transmitted on the multiplex line connected to the output of the voice memory in transmission time slots allocated to the conference participants, comprising:

for setting up conference calls having three participating conference participants, a read,only memory;

utilizing the read-only memory, means for performing the functions of linearization and of companding, and a function of adding of said individual signals of the conference participants;

means for supplying thereto the various groups of two of individual signals of respectively two conference participants supplied in the successive conference time slots as selection addresses for a read selection of a memory location containing the respective result signal in companded form;

the read-only memory having a first memory area in whose memory locations are stored all possible companded sum values of first and second individual signals and having a second memory area in whose memory locations are stored all possible companded difference values between the first and second individual signals;

a comparator to which operational sign bits of respective groups of two individual signals are supplied and whose output signal determines in which of the first and second memory areas the selection addresses formed by remaining bits of the two individual signals act as read addresses;

a decision circuit to which is supplied an area signal output together with the result signal output from the read-only memory, the area signal indicating, whether the result signal derives from the first memory area or from a part of the second memory area wherein result signals are stored corresponding to a difference between a greater individual signal of the first and second individual signals and a lesser individual signal of the first and second individual signals, or whether the result signal derives from a part of the second memory area wherein result signals corresponding to a difference between a lesser individual signal of the first and second individual signals and a greater individual signal of the first and second individual signals are stored, and to which the operational sign bit of the second individual signal of the first and second individual signals is supplied and which outputs this operational sign bit of the second individual signal in original form as an operational sign bit of the result signal to be forwarded in case of a first memory area signal value and outputs this operational sign bit in inverted form as an operational sign bit of the result signal to be forwarded in case of a second memory area signal value.

3. A method for setting up conference connections in a digital time-division multiplex telecommunications switching center having a circuit arrangement for setting up conference connections, the circuit arrangement lying in a feedback loop connecting to an output of a voice memory of a switching network that can be cyclically written into and randomly read-out to an input of the voice memory, multiplex lines being connected to the input and output of the voice memory, comprising the steps of:

forming directly successive conference time slots in addition to a plurality of transmission time slots wherein information transmissions ensue from and to the switching center;

providing conference memory cells allocated to conference time slots in an appertaining holding memory of the voice memory in addition to holding memory cells that are required during the course of a switching of two-party connections;

during a conference connection, receiving in the circuit arrangement individual signals of the conference participants converted into conference time slots by random read-out from the voice memory and, after a linearization thereof, forming result signals therefrom individually associated to conference participants that do not contain an intrinsic part and outputting these result signals onto the multiplex line connected to the input of the voice memory in corresponding conference time slots after a companding, the result signals then being cyclically written into the allocated additional conference memory cells and these result signals, after random read-out, being further transmitted on the multiplex line connected to the output of the voice memory in transmission time slots allocated to the conference participants;

for setting up conference calls having three participating conference participants, providing a read-only memory, the read-only memory having separate memory areas for respectively storing sums of individual signals, and storing two types of differences of individual signals as a function of operational sign bits associated with the individual signals, and utilizing the read-only memory to perform both the functions of linearization and of companding as well as a function of adding of said individual signals of the conference participants, supplying thereto various groups of two of individual signals of respectively two conference participants supplied in the successive conference time slots as selection addresses for a read selection of a memory location containing the respective result signal in companded form.

4. A method for setting up conference connections in a digital time-division multiplex telecommunications switching center having a circuit arrangement for setting up conference connections, the circuit arrangement lying in a feedback loop connecting to an output of a voice memory of a switching network that can be cyclically written into and randomly read-out to an input of the voice memory, multiplex lines being connected to the input and output of the voice memory, comprising the steps of:

forming directly successive conference time slots in addition to a plurality of transmission time slots wherein information transmissions ensue from and to the switching center;

providing conference memory cells allocated to conference time slots in an appertaining holding memory of the voice memory in addition to holding memory cells that are required during the course of a switching of two-party connections;

during a conference connection, receiving in the circuit arrangement individual signals of the conference participants converted into conference time slots by random read-out from the voice memory and, after a linearization thereof, forming result signals therefrom individually associated to conference participants that do not contain an intrinsic part and outputting these result signals onto the multiplex line connected to the input of the voice memory in corresponding conference time slots after a companding, the result signals then being cyclically written into the allocated addition conference memory cells and these result signals, after random read-out, being further transmitted on the multiplex line connected to the output of the voice memory in transmission time slots allocated to the conference participants;

for setting up conference calls having three participating conference participants, providing a read-only memory, and utilizing the read-only memory to perform both the functions of linearization and of companding as well as a function of adding of said individual signals of the conference participants, supplying thereto various groups of two of individual signals of respectively two conference participants supplied in the successive conference time slots as selection addresses for read selection of a memory location containing the respective result signal in companded form, the read-only memory having a first memory area in whose memory locations are stored all possible companded sum values of two individual signals and having a second memory area in whose memory locations are stored all possible companded difference values between two individual signals; providing a comparator to which operational sign bits of respective groups of two individual signals are supplied and whose output signal determines in which of the first and second memory areas the selection addresses formed by remaining bits of the two individual signals act as read addresses; and providing a decision circuit to which is supplied an area signal output together with the result signal output from the read-only memory, the area signal indicating, whether the result signal derives from the first memory area or from a part of the second memory area wherein result signals are stored corresponding to a difference between a greater individual signal of the two individual signals and a lesser individual signal of the two individual signals, or whether the result signal derives from a part of the second memory area wherein result signals corresponding to a difference between a lesser individual signal of the two individual signals and a greater individual signal of the two individual signals are stored, and to which the operational sign bit of the second individual signal is supplied and which outputs this operational sign bit in original form as an operational sign bit of the result signal to be forwarded in case of a first memory area signal value and outputs this operational sign bit in inverted from as operational sign bit of the result signal to be forwarded in case of a second memory area signal value.

5. The method according to claim 3, wherein the method further comprises, given the mixing-in of a call progress tone, supplying the results signals, to which said call progress tone appertains, a second time to the circuit arrangement together with a signal corresponding to the call progress tone, and supplying the results signals, to which said call progress tone appertains, to the read-only memory for processing in the same manner as an individual signal of a further conference subscriber.

6. A circuit arrangement for setting up conference connections in a digital time-division multiplex telecommunications switching center, the circuit arrangement lying in a feedback loop connecting to an output of a voice memory of a switching network that is cyclically written into and randomly read-out to an input of the voice memory, multiplex lines being connected to the input and output of the voice memory on which directly successive conference time slots are additionally formed beyond a plurality of transmission time slots wherein information transmissions ensue from and to the switching center, said voice memory having in an appertaining hold memory conference memory cells, that are allocated to said conference time slots, in addition to holding memory cells that are required during the course of a switching of two-party connections, said circuit arrangement, during a conference connection, receiving individual signals of the conference participants converted into conference time slots by random read-out from the voice memory and, after a linearization thereof, forming result signals therefrom individually associated to conference participants that do not contain an intrinsic part and outputting these result signals onto the multiplex line connected to the input of the voice memory in corresponding conference time slots after a companding, the result signals being then cyclically written into the allocated additional conference memory cells and these result signals, after random read-out, being further, transmitted on the multiplex line connected to the output of the voice memory in transmission time slots allocated to the conference participants, comprising:

for setting up conference calls having three participating conference participants, a first register having an input for receiving groups of two of successive conference time slots;

a second register having an input connected to a first output of said first register;

a comparator having a first input connected to an operational sign output of said second register and having a second input connected to an operational sign output of said first register;

a read-only memory having control inputs connected to a first output of the second register and to said first output of said first register, and having a selection input connected to an output of said comparator, the read-only memory having separate memory areas for respectively storing sums of individual signals and storing two types of differences of individual signals as a function of operational sign bits associated with the individual signals;

an exclusive OR element having a first input connected to an area signal output of said read-only memory and having a second input connected to said operational sign output of said first register;

a third register having a first input connected to an output of said exclusive OR element and having a second input connected to further outputs of the read-only memory and having an output;

wherein the circuit arrangement utilizes the read-only memory for performing both the functions of linearization and of companding, as well as a function of adding of said individual signals of the conference participants, being thereby supplied with various groups of two of individual signals of respectively two conference participants supplied in the successive conference time slots as selection addresses for a read selection of a memory location containing the respective result signal in companded form.

7. A circuit arrangement for setting up conference connections in a digital time-division multiple telecommunications switching center, the circuit arrangement lying in a feedback loop connecting to an output of a voice memory of a switching network that is cyclically written into and randomly read-out to an input of the voice memory, multiplex lines being connected to the input and output of the voice memory on which directly successive conference time slots are additionally formed beyond a plurality of transmission time slots wherein information transmissions ensue from and to the switching center, said voice memory having in an appertaining hold memory conference memory cells, that are allocated to said conference time slots, in addition to holding memory cells that are required during the course of a switching of two-party connections, said circuit arrangement, during a conference connection, receiving individual signals of the conference participants converted into conference time slots by random read-out from the voice memory and, after a linearization thereof, forming result signals therefrom individually associated to conference participants that do not contain an intrinsic part and outputting these result signals onto the multiplex line connected to the input of the voice memory in corresponding conference time slots after a companding, the result signals being then cyclically written into the allocated additional conference memory cells and these result signals, after random read-out, being further, transmitted on the multiplex line connected to the output of the voice memory in transmission time slots allocated to the conference participants, comprising:

for setting up conference calls having three participating conference participants, a first register having an input for receiving groups of two of successive conference time slots;

a second register having an input connected to a first output of said first register;

a comparator having a first input connected to an operational sign output of said second register and having a second input connected to an operational sign output of said first register;

a read-only memory having control inputs connected to a first output of the second register and to said first output of said first register, and having a selection input connected to an output of said comparator;

an exclusive OR element having a first input connected to an area signal output of said read-only memory and having a second input connected to said operational sign output of said first register;

a third register having a first input connected to an output of said exclusive OR element and having a second input connected to further outputs of the read-only memory and having an output;

wherein the circuit arrangement utilizes the read-only memory for performing both the functions of linearization and of companding, as well as a function of adding of said individual signals of the conference participants, being thereby supplied with various groups of two of individual signals of respectively two conference participants supplied in the successive conference time slots as selection addresses for a read selection of a memory location containing the respective result signal in companded form;

the read-only memory having a first memory area in whose memory locations are stored all possible companded sum values of first and second individual signals and having a second memory area in whose memory locations are stored all possible companded difference values between the first and second individual signals, a sum of the addends of the first and second individual signals being stored in the first memory area, a difference of the first and second individual signals being stored in a first part of the second memory area when the addend of the second individual signal is greater than or equal-to the addend of the first individual signal, a difference of the first and second individual signals being stored in a second part of the second memory area when the addend of the second individual signal is less-than the addend of the first individual signal, wherein the comparator receives operational sign bits of respective groups of the first and second individual signals and whose output signal determines in which of the first and second memory areas the selection addresses formed by remaining bits of the first and second individual signals act as read addresses; and the exclusive OR element being a decision circuit to which is supplied an area signal output together with the result signal output from the read-only memory, the area signal indicating, whether the result signal derives from the first memory area or from the first part of the second memory area or whether the result signal derives from the second part of the second memory area, and to which the operational sign bit of the second individual signal is supplied and which outputs this operational sign bit in original form as an operational sign bit of the result signal to be forwarded in case of a first memory area signal value and outputs this operational sign bit in inverted form as an operational sign bit of the result signal to be forwarded in case of a second memory area signal value.

8. The method according to claim 4, wherein the method further comprises, given the mixing-in of a call progress tone, supplying the results signals, to which said call progress tone appertains, a second time to the circuit arrangement together with a signal corresponding to the call progress tone, and supplying the results signals, to which said call progress tone appertains, to the read-only memory for processing in the same manner as an individual signal of a further conference subscriber.

* * * * *